United States Patent
Poosapalli et al.

(10) Patent No.: US 12,061,912 B2
(45) Date of Patent: Aug. 13, 2024

(54) CONTEXT-AWARE THIN-NETWORK STACK TO PROVIDE RICH NETWORK FEATURES IN SPLIT BOOT ARCHITECTURE

(71) Applicant: Dell Products L.P., Round Rock, TX (US)

(72) Inventors: Karunakar Poosapalli, Medak (IN); Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/590,400

(22) Filed: Feb. 1, 2022

(65) Prior Publication Data
US 2023/0244497 A1    Aug. 3, 2023

(51) Int. Cl.
*G06F 9/4401* (2018.01)
(52) U.S. Cl.
CPC .................. *G06F 9/4416* (2013.01)
(58) Field of Classification Search
CPC .... G06F 9/4416; G06F 9/4406; G06F 9/4408; G06F 9/441; G06F 9/4411
See application file for complete search history.

(56) References Cited

U.S. PATENT DOCUMENTS

| | | | |
|---|---|---|---|
| 6,446,203 B1 * | 9/2002 | Aguilar | G06F 9/4408 714/36 |
| 6,598,159 B1 * | 7/2003 | McAlister | G06F 9/4416 709/222 |
| 2009/0327463 A1 * | 12/2009 | Saito | G06F 9/441 709/222 |
| 2011/0055535 A1 * | 3/2011 | Verdy | G06F 8/61 713/100 |
| 2013/0268744 A1 * | 10/2013 | Chan | G06F 9/4411 713/2 |
| 2016/0188345 A1 * | 6/2016 | Chen | G06F 9/4403 713/2 |

* cited by examiner

*Primary Examiner* — Jaweed A Abbaszadeh
*Assistant Examiner* — Brian J Corcoran
(74) *Attorney, Agent, or Firm* — Jackson Walker L.L.P.

(57) ABSTRACT

An information handling system may include a processor and a basic input/output system communicatively coupled to the processor and comprising a program of executable instructions configured to determine a context associated with a current boot session of the information handling system and based on user boot history stored during one or more previous boot sessions of the information handling system and the context, load one or more network drivers necessary to boot the information handling system in accordance with the context.

6 Claims, 3 Drawing Sheets

CONTEXT-AWARE THIN-NETWORK STACK TO PROVIDE RICH NETWORK FEATURES IN SPLIT BOOT ARCHITECTURE

TECHNICAL FIELD

The present disclosure relates in general to information handling systems, and more particularly to methods and systems for implementing a context-aware thin-network stack to provide rich network features in a split boot architecture.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the advent of more advanced networking features, the basic input/output system (BIOS) Unified Extensible Firmware Interface (UEFI) network stack is becoming richer. At the same time, split BIOS is beginning to push all non-core modules outside the Serial Peripheral Interface (SPI) flash memory in which BIOS code is stored, and into non-volatile storage in order to provide sustainability for growth of the SPI flash memory. Loading a legacy and traditional UEFI network stack with such split BIOS architecture may be suboptimal, as use of legacy and traditional UEFI network stacks may negatively affect boot time.

To illustrate, in traditional approaches, UEFI may boot various network drivers, leading to a heavyweight network stack during power-on/self-test (POST). Such drivers may be loaded by default, with no intelligence presence to learn from a previous boot and infer a current boot type to have an optimized boot path. Under existing approaches, for a network boot path such as that used to Pre-Execution Environment (PXE) boot or Hypertext Transfer Protocol (HTTP) boot, a pre-boot Driver Execution Environment (DXE) dispatch list may dispatch all network drivers irrespective of network boot type. This may lead to long boot times when PXE is set to a default boot path and boot falls back to boot from a local disk drive.

A boot path setting may be a serious concern in pre-boot space, as boot path may not be adaptive to boot type. A network boot path may also provide an attack surface for network vulnerability, especially in wireless networks, by enumerating all network protocols and drivers. For example, malware in memory may be transient upon reset and may easily override enumeration of network modules with a current boot path.

As another example, when a UEFI network option is enabled in BIOS setup, and boot type is boot to operating system, existing methods may have no intelligence to selectively load the operating system-supportive network initiation modules. Rather, the entire BIOS network stack drivers may be loaded during pre-boot. Further, when a user boots to an operating system, boots to BIOS setup, or opts to execute a one-time boot menu, on every instance of the boot, BIOS may parse the Virtual Local Area Network forwarding/routing (VFR) for various components of an information handling system, which may take significant time during pre-boot. However, when booting to an operating system, there is no need to parse VFR configuration pages for the network stack.

SUMMARY

In accordance with the teachings of the present disclosure, the disadvantages and problems associated with configuring a network stack during boot may be reduced or eliminated.

In accordance with embodiments of the present disclosure, an information handling system may include a processor and a basic input/output system communicatively coupled to the processor and comprising a program of executable instructions configured to determine a context associated with a current boot session of the information handling system and based on user boot history stored during one or more previous boot sessions of the information handling system and the context, load one or more network drivers necessary to boot the information handling system in accordance with the context.

In accordance with these and other embodiments of the present disclosure, a method may include, in an information handling system, determining, by a basic input/output system of the information handling system that comprises a program of executable instructions, a context associated with a current boot session of the information handling system and based on user boot history stored during one or more previous boot sessions of the information handling system and the context, loading, by the basic input/output system, one or more network drivers necessary to boot the information handling system in accordance with the context.

In accordance with these and other embodiments of the present disclosure, an article of manufacture may include a non-transitory computer-readable medium and computer-executable instructions carried on the computer-readable medium, the instructions readable by the processor, the instructions, when read and executed, for causing the processor to, by a basic input/output system of the information handling system, determine a context associated with a current boot session of the information handling system and based on user boot history stored during one or more previous boot sessions of the information handling system and the context, load one or more network drivers necessary to boot the information handling system in accordance with the context.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
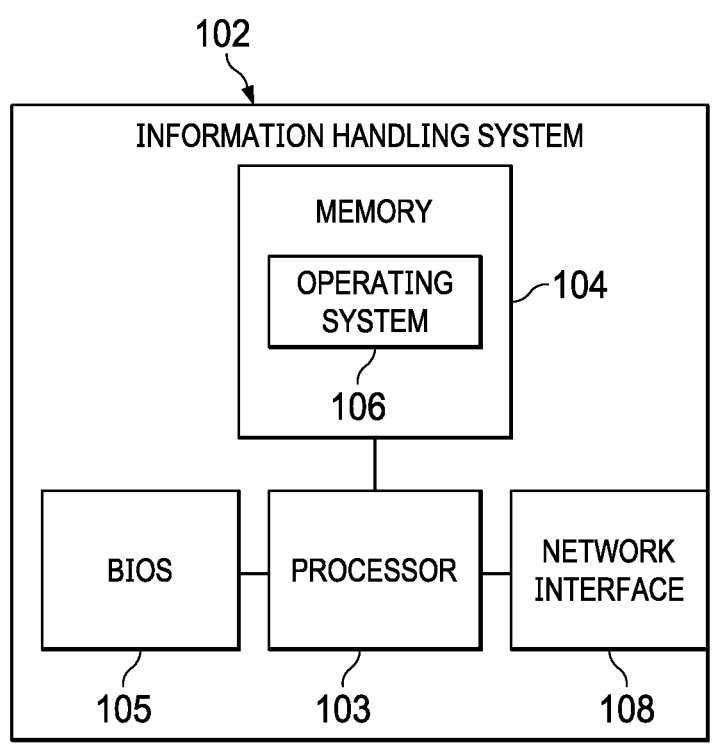
FIG. 1 illustrates a block diagram of an information handling system, in accordance with embodiments of the present disclosure.
Figure 2A:
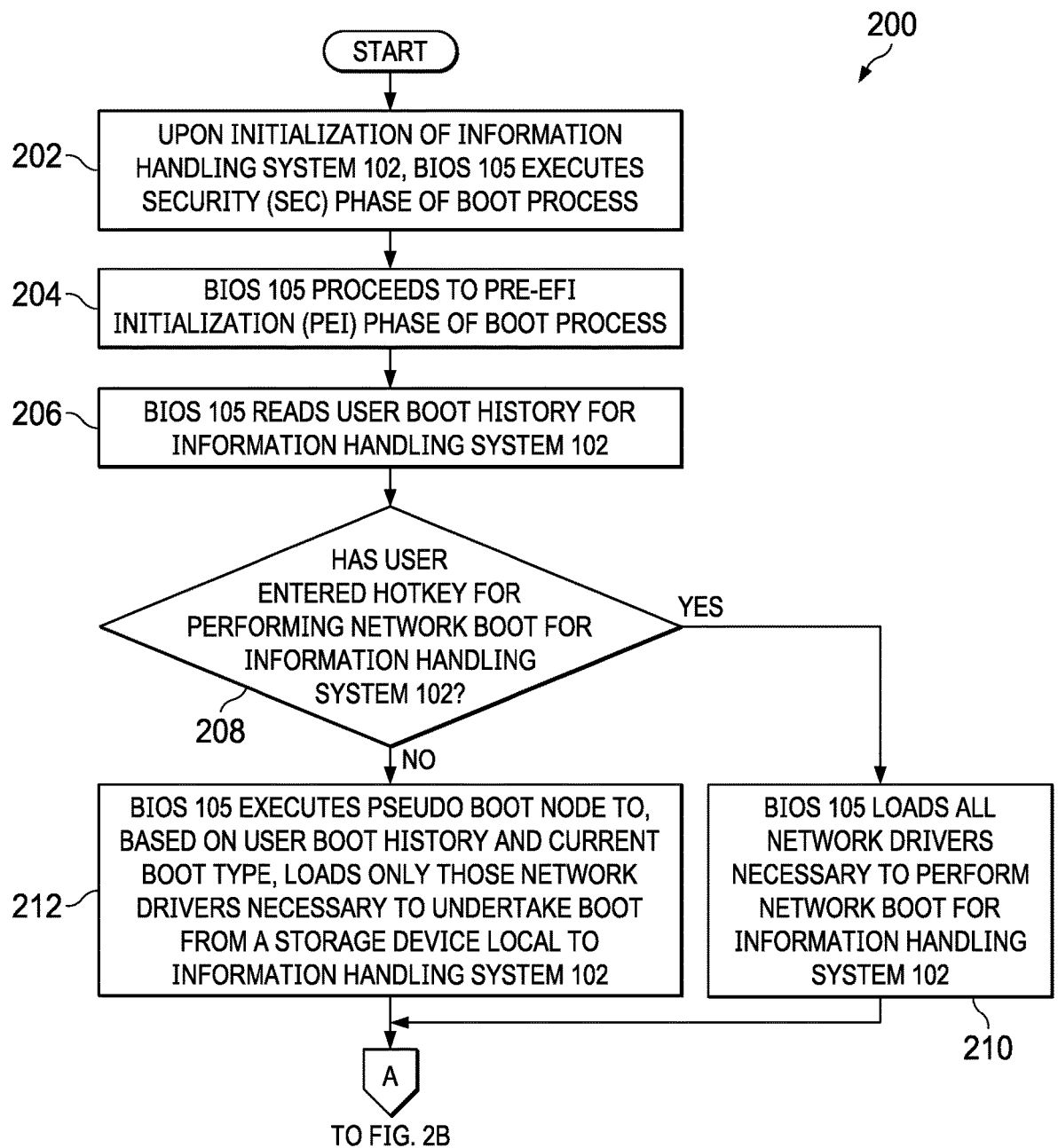
FIGS. 2A and 2B (which may be referred to herein collectively as FIG. 2) illustrate a flowchart of an example method for context-aware thin-network stack for use in a split-boot architecture, in accordance with embodiments of the present disclosure.
Figure 2B:
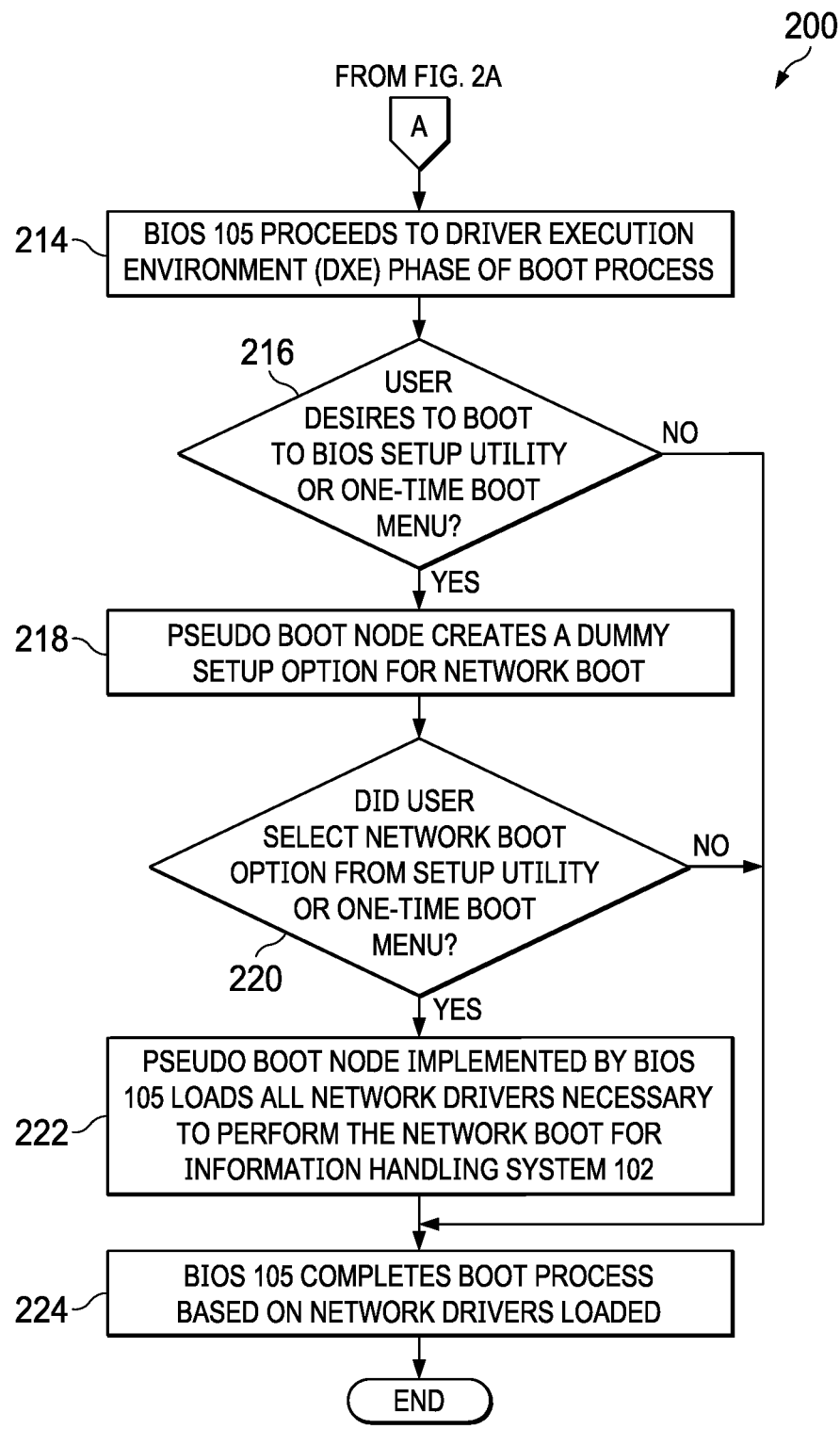

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, an information handling system 102 may comprise a personal computer. In some embodiments, an information handling system 102 may comprise or be an integral part of a server. In other embodiments, an information handling system 102 may comprise a portable information handling system (e.g., a laptop or notebook, etc.). As depicted in FIG. 1, an information handling system 102 may include a processor 103, a memory 104 communicatively coupled to processor 103, a BIOS 105 communicatively coupled to processor 103, and a network interface 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. Network interface 108 may be configured to communicate via wire-line transmissions, wireless transmission, or both.

In addition to processor 103, memory 104, BIOS 105, and network interface 108, information handling system 102 may include one or more other information handling resources.

In operation, BIOS 105 may be configured to learn from boot history and prepare boot data sets based on boot history. BIOS 105 may further be configured to process such data sets to derive an optimized network stack for a particular boot path. BIOS 105 may also be configured to perform boot context determination in order to determine a boot type and combine the determination of boot type with the boot path data sets in order to further ensure a thin network stack is built.

In addition, BIOS 105 may implement an adaptive Network Security Protocol (NPS) to dynamically link security packages in order to provide an end-to-end secure boot network path. Moreover, BIOS 105 may implement pseudo boot node (PBN) as a Peripheral Component Interconnect Enhanced PCIe device method that executes vulnerable overrides into Pseudo Nodes and protects legitimate PCIe device or network protocol enumerations caused by reset from operating system 106.

FIG. 2 illustrates a flowchart of an example method 200 for context-aware thin-network stack for use in a split-boot architecture, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, after a reset, powering-on, or other initialization of information handling system 102, BIOS 105 may execute the security (SEC) phase of the boot process. At step 204, BIOS 105 may proceed to the Pre-EFI Initialization (PEI) phase of the boot process. At step 206, during the PEI phase, BIOS 105 may read user boot history for information handling system 102, which may be stored in non-volatile memory accessible to BIOS 105. Such user boot history may include any suitable parameters (e.g., boot type, boot mode, boot path, drivers loaded, etc.) regarding a previous boot of information handling system 102.

At step 208, also during the PEI phase, BIOS 105 may determine if a user has entered a hotkey (e.g., F3, F4, F5) for performing a network boot for information handling system 102 (e.g., PXE boot, HTTP boot, Internet Small Computer System Interface (iSCSI) boot, etc.). If a user enters a hotkey for performing a network boot for information handling system 102, method 200 may proceed to step 210. Otherwise, method 200 may proceed to step 212.

At step 210, BIOS 105 may load all network drivers necessary to perform the network boot for information handling system 102. At completion of step 210, method 200 may proceed to step 214.

At step 212, BIOS 105 may execute a Pseudo Boot Node that, based on the user boot history and the current boot type, loads only those network drivers necessary to undertake boot from a storage device local to information handling system 102 (e.g., boot to operating system 106). In particular, network drivers required for network boot but not required for boot from the local storage device may remain unloaded.

At step 214, BIOS 105 may proceed to the Driver Execution Environment (DXE) phase of the boot process. At step 216, during DXE, BIOS 105 may determine if the user desires to boot to a BIOS setup utility (e.g., F2 hotkey) or a one-time boot menu (e.g., F12 hotkey). If a user indicates a desire to boot to the BIOS setup utility or the one-time boot menu, method 200 may proceed to step 218. Otherwise, method 200 may proceed to step 224.

At step 218, the Pseudo Boot Node implemented by BIOS 105 may create a dummy setup option for network boot. At step 220, BIOS 105 may determine if a user selects a network boot option from the setup utility or one-time boot menu. If the user selects a network boot option, method 200 may proceed to step 222. Otherwise, method 200 may proceed to step 224.

At step 222, the Pseudo Boot Node implemented by BIOS 105 may load all network drivers necessary to perform the network boot for information handling system 102. At completion of step 222, method 200 may proceed to step 224.

At step 224, BIOS 105 may proceed to the Boot Device Selection (BDS) phase of the boot process, and proceed to complete the boot process based on the network drivers loaded. Accordingly, for boot sessions in which a network boot is not desired (e.g., boot to operating system 106), only a limited set of network drivers needed to boot to operating system 106, and not those necessary for network boot, may be loaded and enabled. During the boot process, BIOS 105 may, based on the current boot session, use boot history regarding parameters of the current boot session (e.g., boot type, boot mode, boot path, drivers loaded, etc.) for consumption during a subsequent boot session. After completion of step 224, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor; and
    a basic input/output system (BIOS) communicatively coupled to the processor and comprising a program of executable instructions configured to perform operations including:
        retrieving user boot history data indicative of one or more boot parameter values pertaining to a previous boot of the information handling system;
        determining, during a pre EFI initialization (PEI) phase of the BIOS, whether a user has entered a hot key for performing a network boot;
        responsive to determining the user has entered a hot key for performing a network boot, loading all network drivers necessary to perform the network boot; and
        responsive to determining the user has not entered a hot key for performing a network boot, executing a pseudo boot node that, based on the user boot history and the current boot type, loading only those network drivers necessary to undertake boot from a storage device local to information handling system.

2. The information handling system of claim 1, wherein the operations further include:
    during a driver execution environment phase (DXE) phase of the BIOS, determining whether the user desires to boot a BIOS setup utility or a one-time boot menu;
    responsive to determining the user desires to boot to the BIOS setup utility or one-time boot menu:
        creating by the pseudo boot node, a dummy setup option for network boot; and
        responsive to determining the user selected network boot option from a setup utility or one-time boot menu, loading, by the pseudo boot node, all network drivers necessary to perform the network boot for the information handling system.

3. The information handling system of claim 2, further comprising, responsive to determining the user did not select the network boot option from the setup utility or one-time boot menu, completing the boot process based on network drivers already loaded.

4. A method comprising, in an information handling system:
    retrieving user boot history data indicative of one or more boot parameter values pertaining to a previous boot of the information handling system;
    determining, during a pre EFI initialization (PEI) phase of the BIOS, whether a user has entered a hot key for performing a network boot;
    responsive to determining the user has entered a hot key for performing a network boot, loading all network drivers necessary to perform the network boot; and
    responsive to determining the user has not entered a hot key for performing a network boot, executing a pseudo boot node that, based on the user boot history and the current boot type, loading only those network drivers necessary to undertake boot from a storage device local to information handling system.

5. The method of claim 4, further comprising during a driver execution environment phase (DXE) phase of the BIOS, determining whether the user desires to boot a BIOS setup utility or a one-time boot menu;
    responsive to determining the user desires to boot to the BIOS setup utility or one-time boot menu:
        creating by the pseudo boot node, a dummy setup option for network boot; and
        responsive to determining the user selected network boot option from a setup utility or one-time boot menu, loading, by the pseudo boot node, all network drivers necessary to perform the network boot for the information handling system.

6. The method of claim 5, further comprising, responsive to determining the user did not select the network boot option from the setup utility or one-time boot menu, completing the boot process based on network drivers already loaded.

* * * * *